Jan. 17, 1956     A. J. KAVANAGH     2,730,925
TWO COMPONENT EYE LENS SYSTEM
Filed April 19, 1954
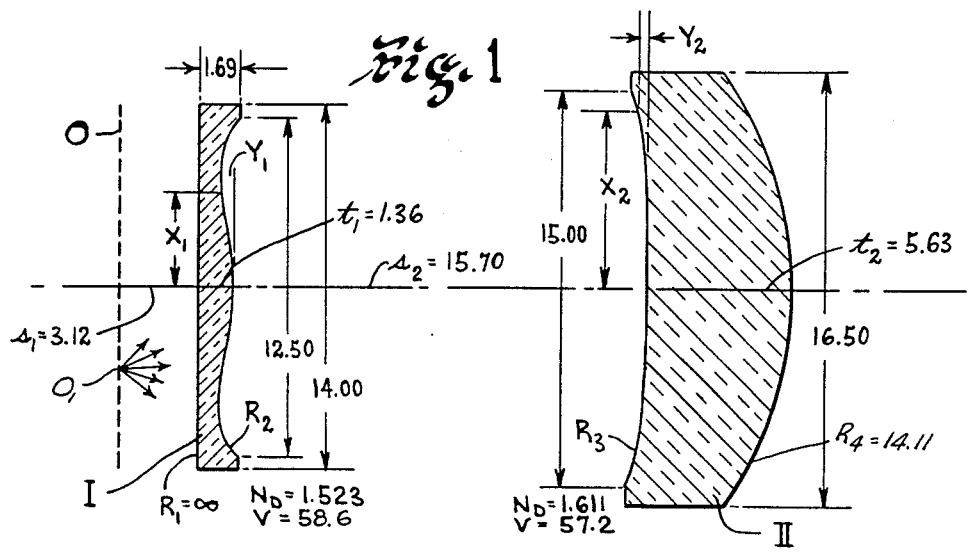
Fig. 1
| $X_1$ | $Y_1$ | $X_1$ | $Y_1$ |
|---|---|---|---|
| 0 | +0 | 3.4 | + .27 |
| .2 | +0 | .6 | + .276 |
| .4 | +0.002 | .8 | + .285 |
| .6 | + .006 | 4.0 | + .29 |
| .8 | + .016 | .2 | + .29 |
| 1.0 | + .030 | .4 | + .285 |
| .2 | + .040 | .6 | + .268 |
| .4 | + .060 | .8 | + .235 |
| .6 | + .078 | 5.0 | + .20 |
| .8 | + .098 | .2 | + .145 |
| 2.0 | + .120 | .4 | + .095 |
| .2 | + .138 | .6 | + .022 |
| .4 | + .167 | .8 | − .07 |
| .6 | + .190 | 6.0 | − .175 |
| .8 | + .205 | .2 | − .315 |
| 3.0 | + .230 | .4 | − .445 |
| .2 | + .25 | | |
Fig. 2 A
| $X_2$ | $Y_2$ | $X_2$ | $Y_2$ |
|---|---|---|---|
| 0 | +0 | 4.0 | + .028 |
| .2 | +0 | .2 | + .033 |
| .4 | +0 | .4 | + .038 |
| .6 | +0 | .6 | + .042 |
| .8 | +0.001 | .8 | + .048 |
| 1.0 | +0.001 | 5.0 | + .055 |
| .2 | +0.001 | .2 | + .061 |
| .4 | + .002 | .4 | + .069 |
| .6 | + .003 | .6 | + .077 |
| .8 | + .004 | .8 | + .085 |
| 2.0 | + .005 | 6.0 | + .096 |
| .2 | + .006 | .2 | + .106 |
| .4 | + .008 | .4 | + .116 |
| .6 | + .010 | .6 | + .129 |
| .8 | + .011 | .8 | + .142 |
| 3.0 | + .013 | 7.0 | + .155 |
| .2 | + .016 | .2 | + .170 |
| .4 | + .019 | .4 | + .188 |
| .6 | + .021 | .6 | + .205 |
| .8 | + .024 | | |
Fig. 2 B
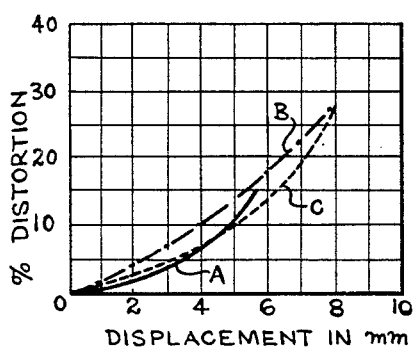
Fig. 3
INVENTOR
ARTHUR J. KAVANAGH
BY Louis L. Gagnon
Robt. S. Williams
ATTORNEYS United States Patent Office 2,730,925
Patented Jan. 17, 1956

2,730,925

TWO COMPONENT EYE LENS SYSTEM

Arthur J. Kavanagh, Southbridge, Mass., assignor to American Optical Company, Southbridge, Mass., a voluntary association of Massachusetts Application April 19, 1954, Serial No. 423,980

6 Claims. (Cl. 88—57)

This invention relates to two-component optical systems and more particularly to two-component lens systems intended for use as oculars or the like particularly in hand supported and head supporting instruments wherein it is desirable that good image forming characteristics be provided with sufficient magnification while the size and weight thereof be maintained at relatively small values.

In certain known types of image converter tubes being used in optical instruments it has been found that considerable pin-cushion distortion exists in the image being formed thereby. This image distortion, it will be readily appreciated, may be very objectionable at times since not only does the distortion make objects at the edges of the field of view of the instrument appear of improper size and shape relative to other parts thereof but also it makes such objects appear to change in size and shape as the instrument is swung laterally causing these objects to move across the field of view. Also at times, such as when an image converter tube is being used in infrared binoculars, telescopes, periscopes and the like, it is desirable to be able to observe the field of view provided by the instrument without having the usable free aperture of the eyepiece be too critical or limiting with respect to the position of the eye of the user of the instrument. In infrared binoculars, telescopes and the like being used upon moving military vehicles, for example, it may be difficult at times to keep the observer's eyes well centered with respect to the eyepiece of the instrument, and in such cases it is most desirable that a comparatively wide free aperture be provided by such an eye lens system.

An eyepiece intended for viewing a near-by emitting surface, such as the face of an image converter tube of such a sighting instrument, must be considered in a different manner than an ordinary telescope or microscope eyepiece, for example, since the former eyepiece does not have a definite eye-point or Ramsden circle and does not receive relatively narrow image forming bundles of rays coming in nearly parallel relation to one another or at relatively small angles from object points such as may be found in an ordinary telescope or microscope. Light coming from the face of an image converter tube and transmitted by an eyepiece of the type being considered herein, on the contrary, may be emitted as a very wide solid cone of rays from each and every point thereof and for this reason the problem of properly accepting and taking best advantage and care of this available light is a very different one.

The eye lens system disclosed in the present invention on the other hand receives relatively wide bundles of light rays and accordingly since it is to provide a fairly wide eye aperture it must be fairly well corrected for spherical aberration and coma. Otherwise the presence of such aberrations will cause the images even of points near the center of the field of view to become astigmatically affected as the observer's eye moves laterally to various off axis positions.

The eye lens system of the present invention is preferably formed as a two-component system in order to keep its size and weight down as much as possible while giving acceptable results with each component thereof comprising preferably a single element providing two refractive surfaces, one of which is of a conventional or regular lens shape and the other of which is irregular or aspherically curved for purposes to be presently described. The two components are air spaced a mean axial amount and one is axially adjustable relative to the other for focusing purposes. One of these two lens elements is in fact in the form of an eye lens arranged to provide a preselected approximate magnification for the system and the other is in the form of a relatively short focus field lens. The eye lens is provided with an aspherically curved surface for correcting the spherical aberration and coma of the system while providing a relatively wide eye aperture, and the field lens is provided with an aspherically curved surface for introducing into the eye lens system radial distortion of a proper amount and sign so that when the system is correctly spaced from the object field to be observed, for example the face of an image converter tube or the like, said system will compensate for the residual distortion existing in the object being observed.

In a preferred form of eye lens system being presented herein and intended for use with image converter tubes or the like, it should be appreciated that no means for achromatization of the system has been given since certain types of phosphor used with such tubes emit in only a relatively narrow spectral range and thus only consideration of the mean wavelength of the light being emitted need be considered in computing the desired optical design. It should be kept in mind, however, that when the object field is emitting white light, it would be possible to employ as the eye lens component of the system a cemented achromatic doublet for color correcting the system while at the same time employing upon one of the exposed surfaces of such a doublet an aspheric curvature for the purposes suggested above.

It is accordingly an object of the present invention to provide an improved ocular or eye lens system for use with a sighting instrument or the like which will properly magnify and correct the image of a near-by object field being observed (such as the face of an image converter tube or the like) in such a manner that the image thereof may be viewed from various angles through a relatively wide eye aperture with a comparatively high degree of correction for spherical aberration and coma and with comparative freedom from image distortion.

It is a further object of the present invention to provide in such an ocular or eye lens system having a relatively wide eye aperture and being well corrected for spherical aberration, coma and image distortion, lens means for achromatizing said system.

Other objects and advantages of the invention will become apparent from the detailed description which follows when taken in conjunction with the accompanying drawing, in which:

Fig. 1 is a diagrammatic showing of an eye lens system embodying a preferred form of the present invention;

Figs. 2a and 2b are, respectively, charts giving actual tabulated values for aspherical surface curvatures of the optical elements of Fig. 1; and Fig. 3 is a graph for use in more readily obtaining an understanding of the present invention.

The optical system of Fig. 1 comprises a first or front lens component I which is arranged to function as a field lens when axially spaced a fixed distance $s_1$ from an object plane O (such as the plane of the face of an image converter tube or the like). This field lens has a first refractive surface $R_1$ which in the present instance is shown as plano and an aspherically curved second surface $R_2$ axially spaced from the first surface by an amount $t_1$. A second or rear lens component II which is in the form of a single eye lens element is axially aligned with the first component and spaced therefrom a mean axial distance $s_2$. The eye lens element is intended for axial adjustment forwardly approximately 2.5 mm. and rearwardly approximately 1.3 mm. for focusing purposes. This lens element II is provided with an aspherically curved front surface $R_3$ and a strongly spherically curved convex rear surface $R_4$ spaced at a distance $t_2$ from the front surface $R_3$.

The index of refraction $N_D$ for the component I is 1.523 and the relative dispersion V is 58.6 while the refractive index $N_D$ for the rear component is 1.611 and the relative dispersion therefor is 57.2. The dimension and values for elements I and II appear in Fig. 1 and the tabulated values for the aspheric surface $R_2$ are as follows:

| $x_1$ | $y_1$ | $x_1$ | $y_1$ |
| --- | --- | --- | --- |
| 0 | +0 | 3.4 | +.27 |
| .2 | +0 | .6 | +.276 |
| .4 | +0.002 | .8 | +.285 |
| .6 | +.006 | 4.0 | +.29 |
| .8 | +.016 | .2 | +.29 |
| 1.0 | +.030 | .4 | +.285 |
| .2 | +.040 | .6 | +.268 |
| .4 | +.060 | .8 | +.235 |
| .6 | +.078 | 5.0 | +.20 |
| .8 | +.098 | .2 | +.145 |
| 2.0 | +.120 | .4 | +.095 |
| .2 | +.138 | .6 | +.022 |
| .4 | +.167 | .8 | −.07 |
| .6 | +.190 | 6.0 | −.175 |
| .8 | +.205 | .2 | −.315 |
| 3.0 | +.230 | .4 | −.445 |
| .2 | +.25 | | |

The tabulated values for the aspheric surface $R_3$ are as follows:

| $x_2$ | $y_2$ | $x_2$ | $y_2$ |
| --- | --- | --- | --- |
| 0 | +0 | 4.0 | +.028 |
| .2 | +0 | .2 | +.033 |
| .4 | +0 | .4 | +.038 |
| .6 | +0 | .6 | +.042 |
| .8 | +0.001 | .8 | +.048 |
| 1.0 | +0.001 | 5.0 | +.055 |
| .2 | +0.001 | .2 | +.061 |
| .4 | +.002 | .4 | +.069 |
| .6 | +.003 | .6 | +.077 |
| .8 | +.004 | .8 | +.085 |
| 2.0 | +.005 | 6.0 | +.096 |
| .2 | +.006 | .2 | +.106 |
| .4 | +.008 | .4 | +.116 |
| .6 | +.010 | .6 | +.129 |
| .8 | +.011 | .8 | +.142 |
| 3.0 | +.013 | 7.0 | +.155 |
| .2 | +.016 | .2 | +.170 |
| .4 | +.019 | .4 | +.188 |
| .6 | +.021 | .6 | +.205 |
| .8 | +.024 | | |

In the preceding tables the $x$ values indicate displacements from the center or optical axis of the respective elements I and II and $y$ values indicate amounts of displacement of the respective curves from a zero point at the vertices thereof.

As indicated by the arrows radiating from point $O_1$ in the object plane O in Fig. 1 light is emitting outwardly in all directions from each and every point of the object field formed by the face of an image converter tube, or the like, and the part of this light which is collected and passes through the eye lens system of the type being described herein is determined primarily by the lens elements of the system and the eye aperture provided thereby. This is in contrast to another known form of eyepiece design such as the type intended for use with a telescope or microscope, wherein only relatively small bundles of rays approach the image plane of the eyepiece in a nearly normal direction thereto and accordingly the problem of spherical aberration in the design of the eye lens system for such an instrument is not an equivalent problem to the one herein presented since the aberration is comparatively small and may generally be satisfactorily balanced out against the spherical aberration characteristics of the objective being used therewith in the instrument.

In an eye lens system of the opposite type, on the other hand, intended to magnify a near-by object field a considerable amount of spherical aberration and coma might be present if this system were merely a conventional magnifying lens system of good quality. Such would not be satisfactory for the present purpose however wherein the eye must be allowed to move to various off axis positions, even though for ordinary use the magnifier is acceptable. One reason for this is that the ordinary magnifier is generally used in a well centered position relative to the user's eye and spherical aberration and coma therefor need not be corrected. Furthermore the use of spherical refracting surfaces can not be satisfactorily employed in the present eye lens system to correct for these aberrations without increasing the number of elements thereof and accordingly materially increasing the size and weight of the system. Also such an ordinary magnifier could not possibly correct the distortion which the improved eye lens system must care for.

If an ordinary magnifying lens system were employed having the spherical aberration and coma mentioned above, the character of the imagery provided thereby even of a point in the object field taken near the center thereof will change considerably as the position of the observer's eye with respect to the eyepiece changes. For example, if the system is undercorrected for spherical aberration and the observer moves his eye from a centered position before the lens outwardly laterally towards the edge of the eyepiece aperture while having his sight fixed upon an object point on the axis of the system, he will observe that this object point appears to move in the direction of the eye. Furthermore he will observe that as the eye moves outwardly the quality of the image may deteriorate noticeably so that instead of appearing at a well defined point the image will be "drawn outwardly" into an astigmatic or comatic flare.

Such a consideration of the eye lens of the present invention is of importance particularly when it is also considered that the tolerances in military service instruments is frequently more stringent than that required for other forms of magnifiers of comparable power. Also of importance is the fact that a lens system of the type described herein may be frequently employed for use in optical instruments upon moving vehicles, and the like, wherein it is at times impractical to keep the observer's eye well centered with respect to the axis of the eye lens. Accordingly, the system should be such that the observer may look through outer portions of the eye lens and obtain nearly as satisfactory results as when looking through the center thereof. Thus it is also desirable that the eye lens aperture be of appreciable size.

It has been found, however, that the aspheric curvature $R_3$, as set forth previously, upon the eye lens may be formed of such a curvature as to reduce this spherical aberration and coma to within acceptable limits while allowing a comparatively wide eyepiece aperture to be employed. Also it has been found that the aspheric curvature $R_2$ upon the field lens may be so shaped as to reduce and even substantially eliminate the residual distortion found to exist in the image upon the face of the image converter tube.

In Fig. 3 there is shown a graph upon which three curves A, B and C are drawn for indicating, with respect to three different known types of image converter tubes, the image distortions actually experienced when employed in infrared instruments. The distortion was measured at different amounts of lateral displacement from the center of the image on the face of the image tube, and even though such distortion may vary when different types of tubes are used, it should be, nevertheless, compensated for by the eye lens system employed.

The solid line curve A shows this distortion at 5½ mm. from the center of the image field, for example, to be approximately 15%. It will be appreciated of course that the value is indicative of the combined distortion introduced by the image converter tube and by the infrared transmitting objective lens system employed in front of the tube. Nevertheless, this combined distortion, it has been found, may be satisfactorily removed by proper design of the eye lens system; rather than attempting to remove same by modification of the infrared objective or of the electronic components of the tube or both. This distortion at the edge of the tube made object points appear further from the optical axis than they would have if no distortion had been present.

In Fig. 1, the field lens I has been provided with one plano surface $R_1$ and on aspherically curved surface $R_2$, with the curvature of the latter shaped in accordance with the measured amount of this distortion to be compensated for. Thus the aspheric surface adds varying amounts of compensating distortion by providing small amounts of positive power at points near the optical axis and stronger negative power at points nearer the outer edge of lens element I. The spherical and aspheric curvatures of the eye lens element II have been concurrently designed so as to substantially correct for the spherical aberration of the system while giving a satisfactory balance for the sine condition of the system but without attempting to correct the system for color. It should be appreciated that while some small amount of lateral color may be present in the lens system of Fig. 1 this color is not objectionable since the system is intended for use with image converter tubes. The spectral emission characteristics of the phosphor used to form the face of such tubes is somewhat restricted and this reduces the problem of color aberrations.

The eye lens and the field lens in an instrument such as a binocular must be, for practical purposes, somewhat restricted. Thus the usable free aperture of such an instrument is limited by the diameters of the lens of the system. If, however, a wider aperture or a larger field lens is desired in such an eye lens system for a different use of the system or if it is to be used with a different spectral emission from the object field being observed, it might be desirable to color correct the system and this may be accomplished by the use of a cemented doublet eyepiece, employing glasses of different indices and dispersive characteristics in known manner.

For best performance results in the preferred optical system of Fig. 1 it was preferable to have the field lens thereof remain in fixed spaced relation relative to the face of the image converter tube and to have the eye lens axially adjustable relative thereto. The space $s_1$ between the field lens and the tube face in the preferred design was 3.12 mm. while the mean spacing $s_2$ between the field lens and the eye lens was chosen as 15.70 mm. An eyepiece aperture in the neighborhood of 15 mm. was provided by the system, and the system provided approximately an 11 power magnification. The equivalent focal length for the system is approximately 21.4 mm. This system when used with an image field having a distortion curve like that provided at A in Fig. 3 give a compensation for distortion of less than 4%. Since the spherical aberration and coma for this noncolor corrected system were fairly well cared for, it was found in actual practice that good imagery was obtained at all eye points from the center to the outer edge of the eyepiece aperture. The quality of the correction for spherical aberration desired was that which would avoid objectionable astigmatism as the eye moved off axis, and that actually obtained in the preferred embodiment was in fact not more than ¼ of a diopter. In fact a preferred range may be stated to be between approximately ¼ and ⅟₁₆ of a diopter and of course even higher corrections (that is, smaller fractions of a diopter) would be more desirable but same, it will be appreciated, are not always readily obtainable.

Having described my invention, I claim:

1. An eye lens system for use in compensating the predetermined residual distortion contained in an object field to be viewed through said system and for providing a desired image magnification when the front surface of said system is disposed a preselected fixed distance from said object field, said system being well corrected for spherical aberration and coma, and consisting of a first lens component and a second lens component in axial alignment therewith, said first lens component having front and rear light refracting surfaces spaced a predetermined axial distance apart, one of said refracting surfaces being aspherically curved, said second lens component having front and rear axially aligned light refracting surfaces spaced a predetermined axial distance apart, one of said surfaces of said second component being aspherically curved, said second component being arranged a mean axial distance from said first component and being of such convergence as to approximately provide said desired image magnification for said system, the aspheric curvature of said first component being of such controlled shape in accordance with the refractive index of said first component as to introduce desired compensating amounts of image distortion into the virtual image being formed by said system, and the aspheric curvature of said second component being so controlled in accordance with the refractive index of said second component as to correct said system to an acceptable degree for spherical aberration and coma, whereby good imagery with freedom from objectionable amounts of distortion will be provided by said eye lens system.

2. An eye lens system for use in compensating the predetermined residual distortion contained in an object field to be viewed through said system and for providing a desired image magnification when the front surface of said system is disposed a preselected fixed distance from said object field, said system being well corrected for spherical aberration and coma, and consisting of a first lens component and a second lens component in axial alignment therewith, said first lens component having front and rear light refracting surfaces spaced a predetermined axial distance apart, one of said refracting surfaces being plano and the other aspherically curved, said second lens component having front and rear axially aligned light refracting surfaces spaced a predetermined axial distance apart, the front surface of said second component being aspherically curved, said second component being arranged a mean axial distance from said first component and having the rear surface thereof strongly convexly curved so as to approximately provide said desired image magnification for said system, the aspheric curvature of said first component being of such controlled shape in accordance with the refractive index of said first component as to introduce desired compensating amounts of image distortion into the virtual image being formed by said system, and the aspheric curvature of said second component being so controlled in accordance with the refractive index of said second component as to correct said system to an acceptable degree for spherical aberration and coma, whereby good imagery with freedom from objectionable amounts of distortion will be provided by said eye lens system.

3. An eye lens system for use in compensating the predetermined residual distortion contained in an object field to be viewed through said system and for providing a desired image magnification when the front surface of said system is disposed a preselected fixed distance from said object field, said system having a relatively wide eye-piece aperture so as to allow sighting through said system while the observer's eye is decentered somewhat relative thereto, said system being well corrected for spherical aberration and coma, and consisting of a first lens component and a second lens component in axial alignment therewith, said first lens component having front and rear light refracting surfaces spaced a predetermined axial distance apart, one of said refracting surfaces being aspherically curved, said second lens component having front and rear axially aligned light refracting surfaces spaced a predetermined axial distance apart, one of said surfaces of said second component being aspherically curved, said second component being arranged a mean axial distance from said first component and being of such convergence as to approximately provide said desired image magnification for said system, the aspheric curvature of said first component being of such controlled shape in accordance with the refractive index of said first component as to introduce desired compensating amounts of image distortion into the virtual image being formed by said system, the compensating amount of image distortion being introduced into said eye lens system by the aspherically curved refracting surface of said first component enabling said system to be used at said relatively wide eyepiece aperture even with the observer's eye at an off-axis position without having material distortion appear in said object field, and the aspheric curvature of said second component being so controlled in accordance with the refractive index of said second component as to correct said system to an acceptable degree for spherical aberration and coma, whereby good imagery with freedom from objectionable amounts of distortion will be provided by said eye lens system.

4. An eye lens system for use in compensating the predetermined residual distortion of an object field to be viewed through said system and for providing a desired image magnification when the front surface of said system is disposed a preselected fixed distance from said object field, said system having a focal length of approximately 22 mm. and a relatively wide eyepiece aperture in the neighborhood of 15 mm. so as to allow sighting through said system while the observer's eye is decentered appreciably relative thereto, said system being well corrected for spherical aberration and coma, and consisting of a short focus first lens component so as to accept a relatively large solid angle of light when emanating from any point in said object field and a second lens component in axial alignment therewith, said first lens component having front and rear light refracting surfaces spaced a predetermined axial distance apart, one of said refracting surfaces being aspherically curved, said second lens component having front and rear axially aligned light refracting surfaces spaced a predetermined axial distance apart, one of said surfaces of said second component being aspherically curved, said second component being arranged a mean axial distance from said first component and being of such convergence as to approximately provide said desired image magnification for said system, the aspheric curvature of said first component being of such controlled shape in accordance with the refractive index of said first component as to introduce desired compensating amounts of image distortion into the virtual image being formed by said system, and the aspheric curvature of said second component being so controlled in accordance with the refractive index of said second component as to correct said system to an acceptable degree for spherical aberration and coma, whereby good imagery with freedom from objectionable amounts of distortion will be provided by said eye lens system.

5. An eye lens system for use in compensating the predetermined residual distortion of an object field to be viewed thereby, said system consisting of a first lens component and a second lens component in axially aligned relation, said first component having front and rear light refracting surfaces spaced approximately 1.36 mm. apart, one of said surfaces being plano and the other aspheric so as to compensate for said residual distortion, and said second component being strongly convergent and axially spaced from said front component so as to provide approximately an 11 power magnification for said system when the focal length thereof is approximately 22 mm., said aspheric surface having a curvature defined by the following values:

| $x_1$ | $y_1$ | $x_1$ | $y_1$ | $x_1$ | $y_1$ |
|---|---|---|---|---|---|
| 0 | +0 | 2.2 | +0.138 | 4.4 | +0.285 |
| .2 | +0 | .4 | +.167 | .6 | +.268 |
| .4 | +0.002 | .6 | +.190 | .8 | +.235 |
| .6 | +.006 | .8 | +.205 | 5.0 | +.20 |
| .8 | +.016 | 3.0 | +.230 | .2 | +.145 |
| 1.0 | +.030 | .2 | +.25 | .4 | +.095 |
| .2 | +.040 | .4 | +.27 | .6 | +.022 |
| .4 | +.060 | .6 | +.276 | .8 | −.07 |
| .6 | +.078 | .8 | +.285 | 6.0 | −.175 |
| .8 | +.098 | 4.0 | +.29 | .2 | −.315 |
| 2.0 | +.120 | .2 | +.29 | .4 | −.445 | and wherein $x_1$ represents in mm. values of displacement from the optical axis and $y_1$ represents in mm. values of axial displacement relative to the vertex of the aspheric curve.

6. An eye lens system for use in compensating the predetermined residual distortion of an object field to be viewed thereby, said system providing a relatively wide eyepiece aperture of approximately 15 mm. and being well corrected for spherical aberration and coma, and consisting of a first lens component and a second lens component in axially aligned relation, said first component having front and rear light refracting surfaces spaced approximately 1.36 mm. apart, one of said surfaces being plano and the other aspheric so as to compensate for said residual distortion, and said second component having front and rear refracting surfaces spaced approximately 5.63 mm. apart, the front surface of said second component being aspheric and the second surface being strongly convex, said first and second components being axially spaced so as to provide approximately an 11 power magnification for said system with the focal length thereof approximately equal to 22 mm., the first mentioned aspheric surface having a curvature defined by the following values:

| $x_1$ | $y_1$ | $x_1$ | $y_1$ | $x_1$ | $y_1$ |
|---|---|---|---|---|---|
| 0 | +0 | 2.2 | +.138 | 4.4 | +.285 |
| .2 | +0 | .4 | +.167 | .6 | +.268 |
| .4 | +0.002 | .6 | +.190 | .8 | +.235 |
| .6 | +.006 | .8 | +.205 | 5.0 | +.20 |
| .8 | +.016 | 3.0 | +.230 | .2 | +.145 |
| 1.0 | +.030 | .2 | +.25 | .4 | +.095 |
| .2 | +.040 | .4 | +.27 | .6 | +.022 |
| .4 | +.060 | .6 | +.276 | .8 | −.07 |
| .6 | +.078 | .8 | +.285 | 6.0 | −.175 |
| .8 | +.098 | 4.0 | +.29 | .2 | −.315 |
| 2.0 | +.120 | .2 | +.29 | .4 | −.445 | and the second mentioned aspheric surface having a curvature defined by the following values:

| $x_2$ | $y_2$ | $x_2$ | $y_2$ | $x_2$ | $y_2$ |
|---|---|---|---|---|---|
| 0 | +0 | 2.6 | +.010 | 5.2 | +.061 |
| .2 | +0 | .8 | +.011 | .4 | +.069 |
| .4 | +0 | 3.0 | +.013 | .6 | +.077 |
| .6 | +0 | .2 | +.016 | .8 | +.085 |
| .8 | +0.001 | .4 | +.019 | 6.0 | +.096 |
| 1.0 | +0.001 | .6 | +.021 | .2 | +.106 |
| .2 | +0.001 | .8 | +.024 | .4 | +.116 |
| .4 | +.002 | 4.0 | +.028 | .6 | +.129 |
| .6 | +.003 | .2 | +.033 | .8 | +.142 |
| .8 | +.004 | .4 | +.038 | 7.0 | +.155 |
| 2.0 | +.005 | .6 | +.042 | .2 | +.170 |
| .2 | +.006 | .8 | +.048 | .4 | +.188 |
| .4 | +.008 | 5.0 | +.055 | .6 | +.205 | and wherein $x_1$ and $x_2$ represent in mm. values of displacement from the optical axis and $y_1$ and $y_2$ represent in mm. values of axial displacement relative to the vertices of the aspheric curves respectively.

(References on following page)

References Cited in the file of this patent

UNITED STATES PATENTS

| | | |
|---|---|---|
| 1,968,222 | Richter | July 31, 1934 |
| 2,388,031 | Bennett | Oct. 30, 1945 |
| 2,482,698 | Tillyer | Sept. 20, 1949 |
| 2,510,521 | Rinia | June 6, 1950 |
| 2,547,958 | Miles | Apr. 10, 1951 |
| 2,588,414 | Rosin | Mar. 11, 1952 |

FOREIGN PATENTS

| | | |
|---|---|---|
| 530,506 | Great Britain | Dec. 13, 1940 |
| 616,565 | Germany | July 31, 1935 |